No. 898,020.
PATENTED SEPT. 8, 1908.
H. M. SUTTON & W. L. & E. G. STEELE.
SEPARATING TABLE.
APPLICATION FILED SEPT. 22, 1906.
7 SHEETS—SHEET 1.
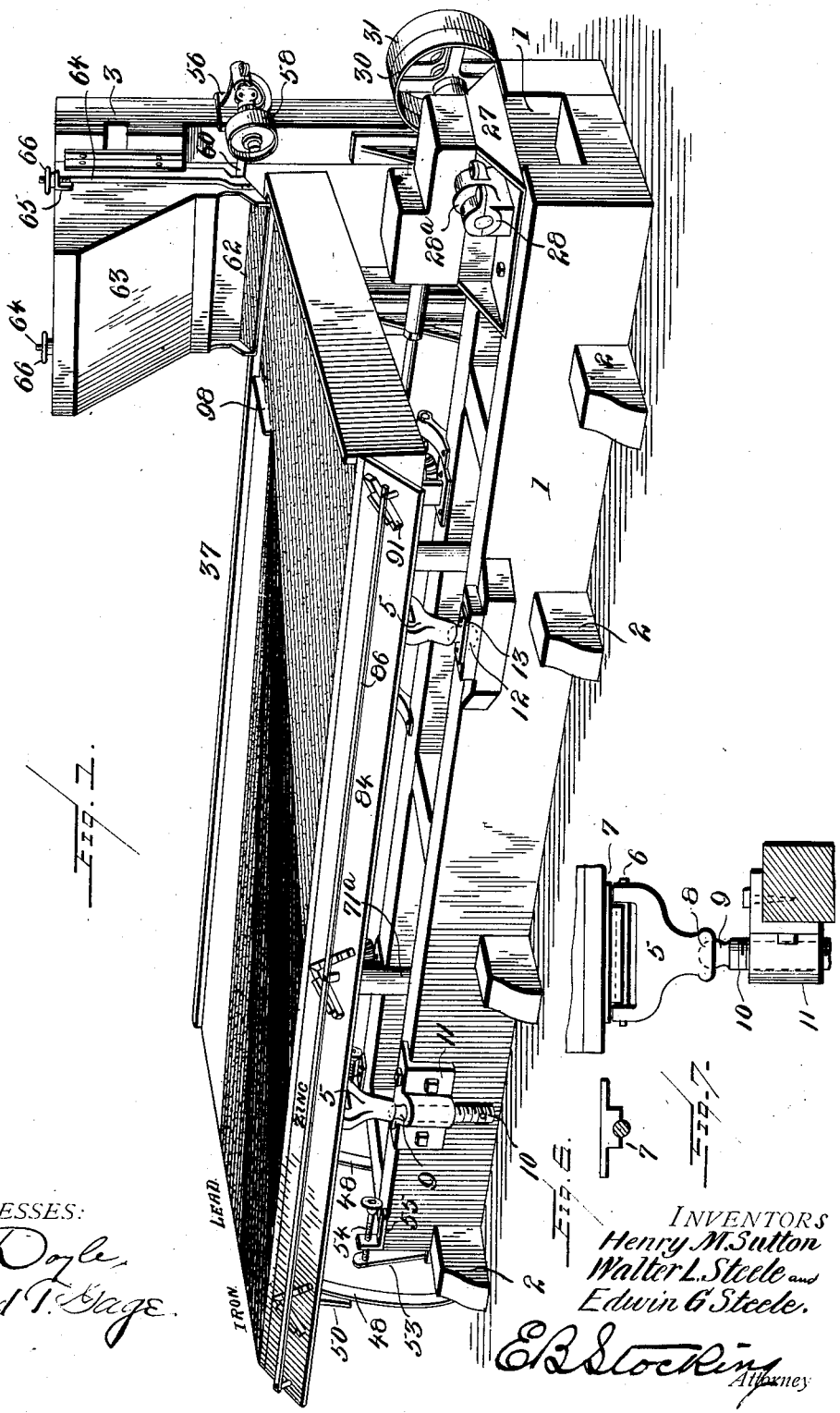
WITNESSES:
INVENTORS
Henry M. Sutton
Walter L. Steele and
Edwin G. Steele.
Attorney

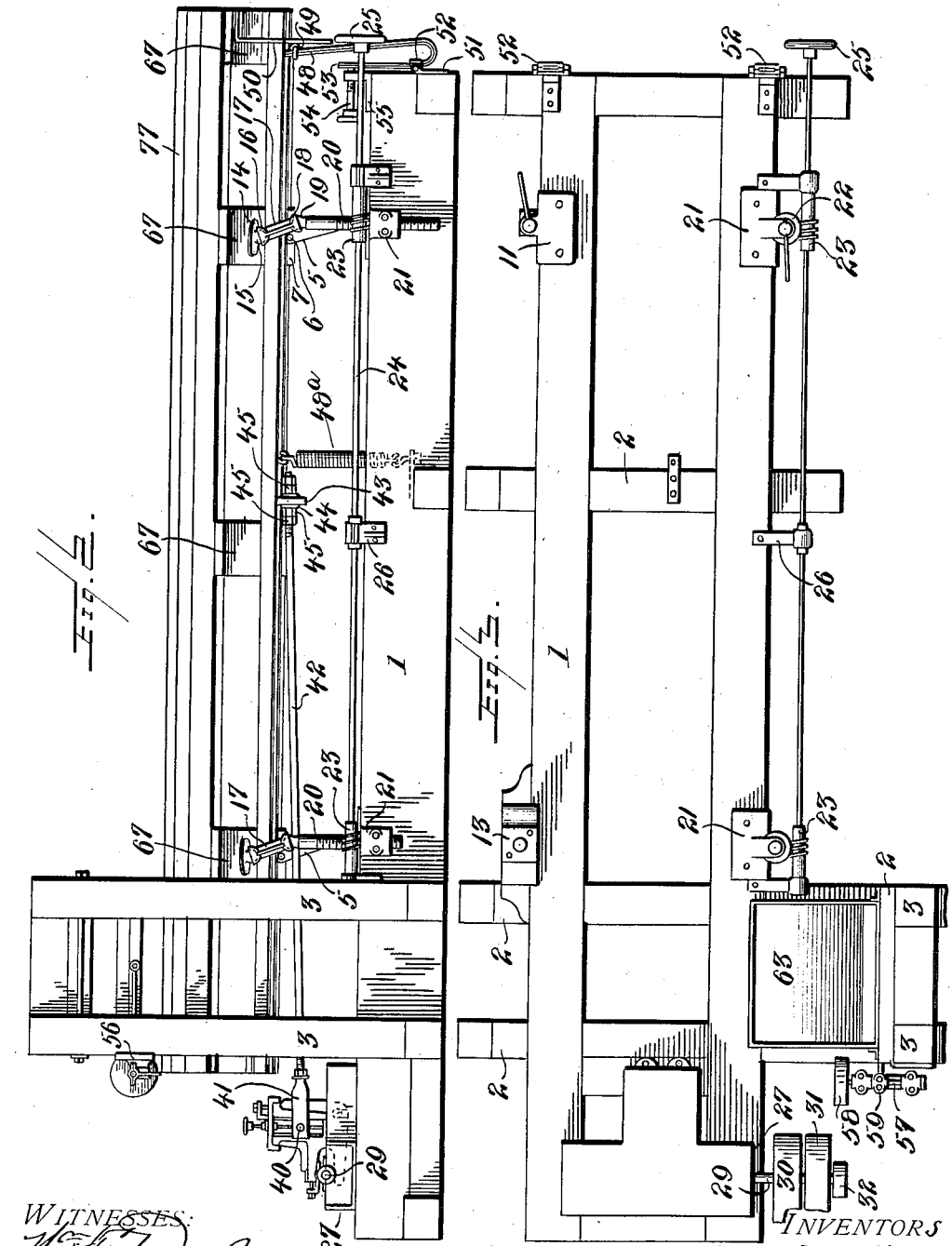

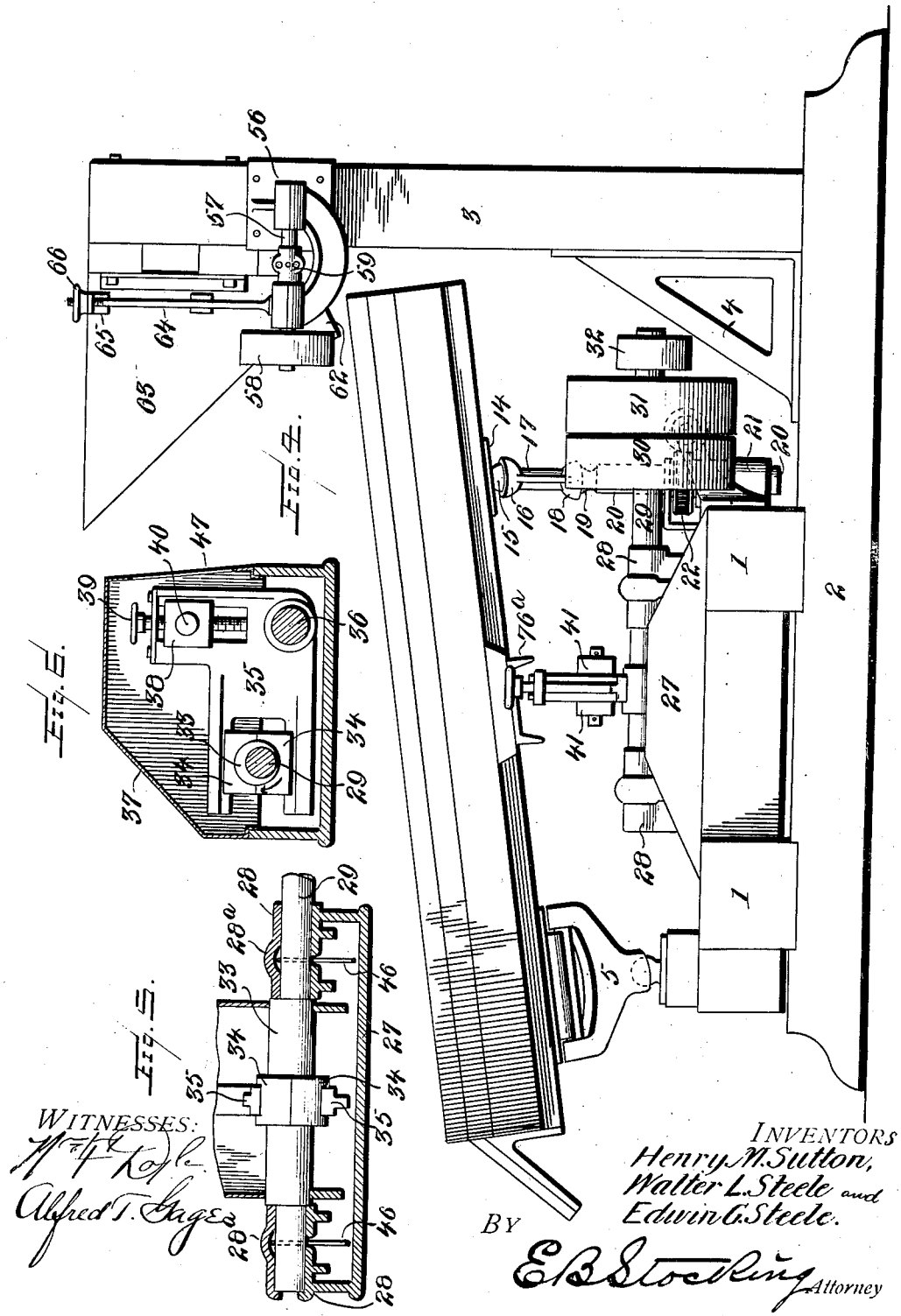

No. 898,020. PATENTED SEPT. 8, 1908.
H. M. SUTTON & W. L. & E. G. STEELE.
SEPARATING TABLE.
APPLICATION FILED SEPT. 22, 1906.
7 SHEETS—SHEET 4.
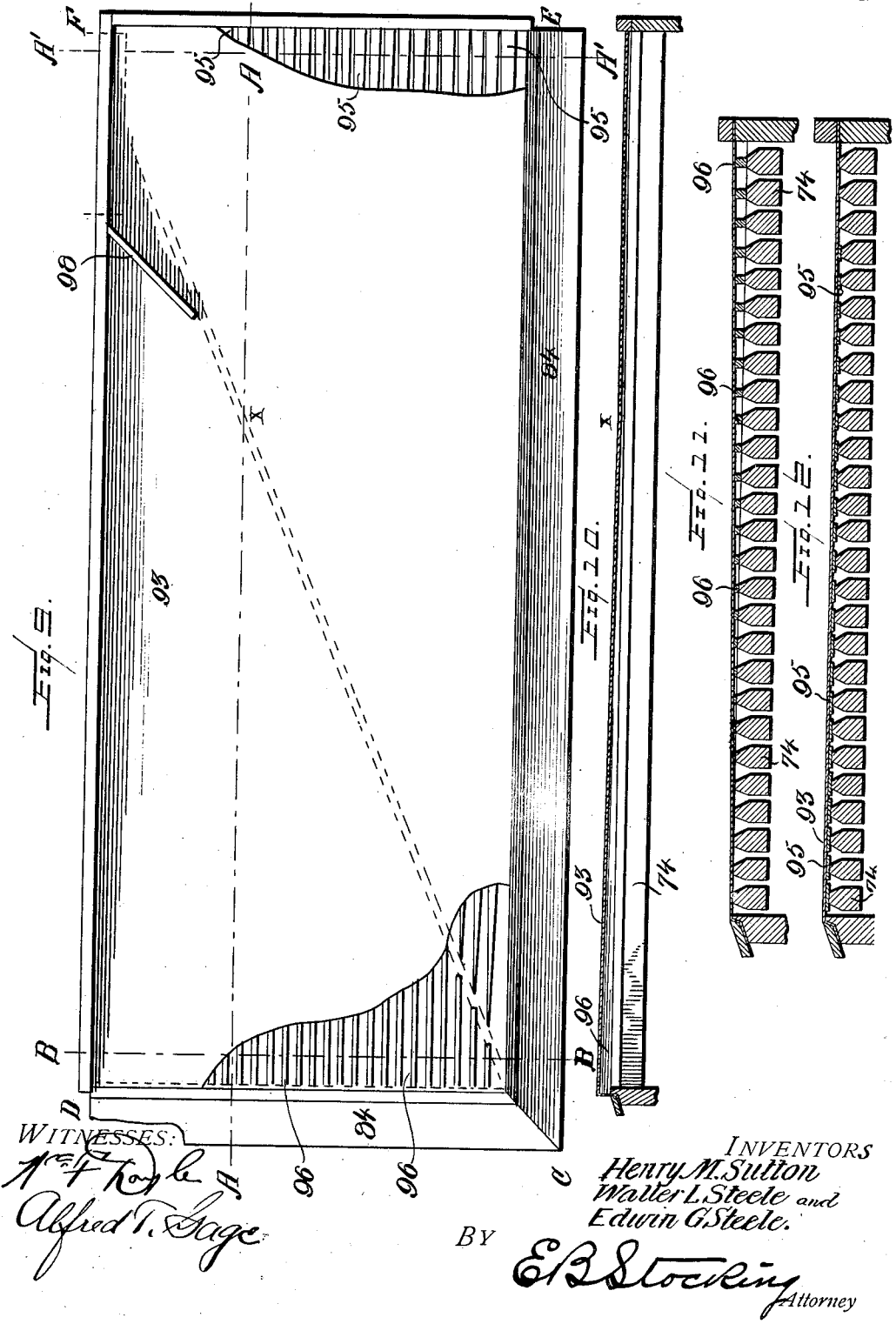
INVENTORS
Henry M. Sutton
Walter L. Steele and
Edwin G. Steele.

No. 898,020. PATENTED SEPT. 8, 1908.
H. M. SUTTON & W. L. & E. G. STEELE.
SEPARATING TABLE.
APPLICATION FILED SEPT. 22, 1906.
7 SHEETS—SHEET 5.
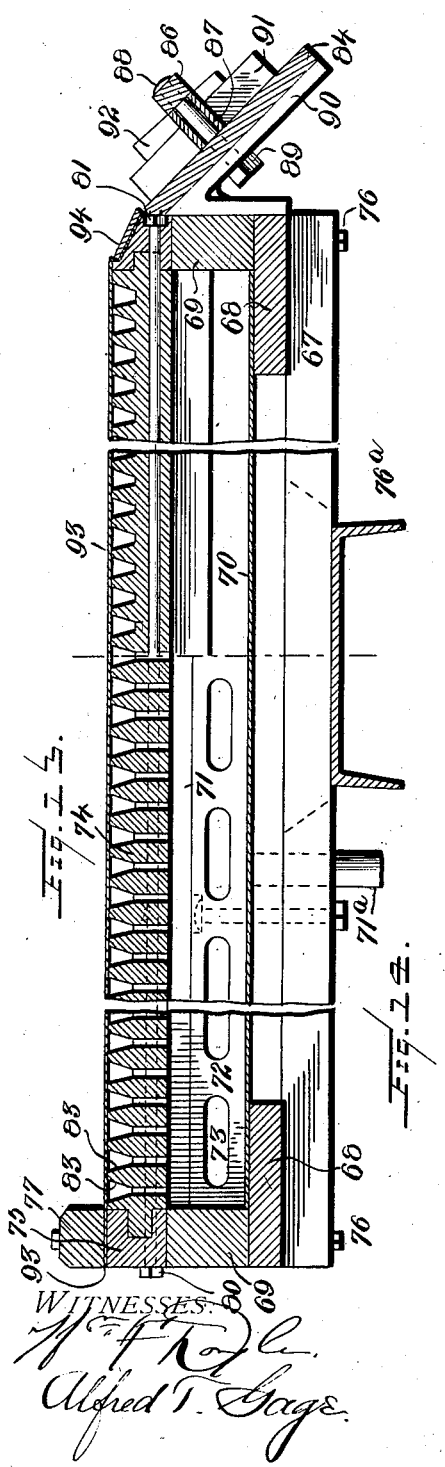
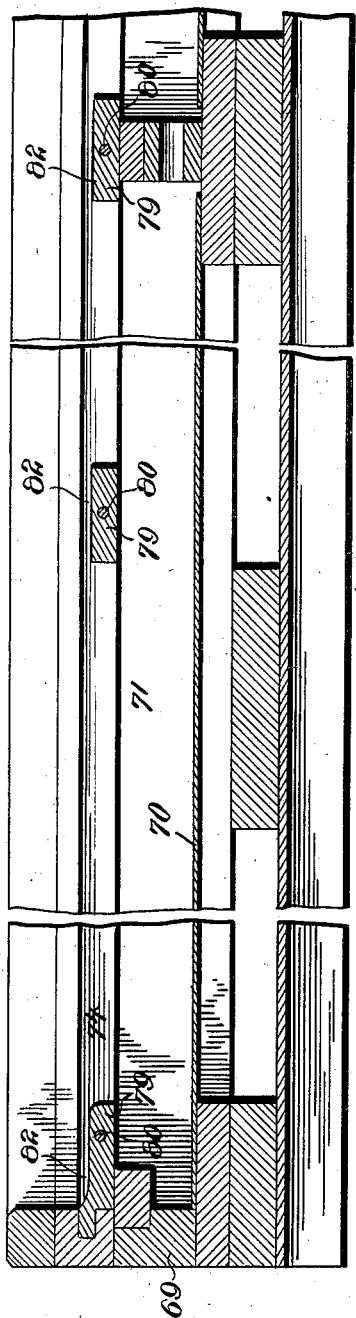
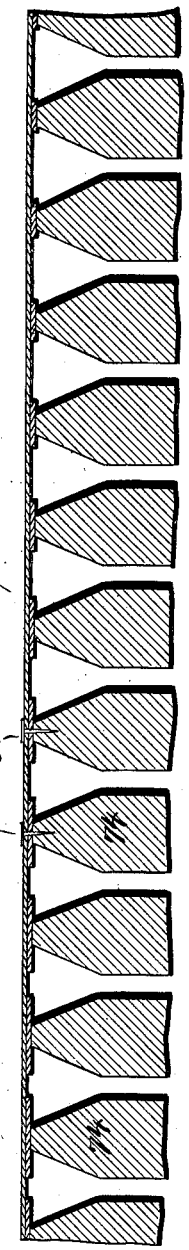
WITNESSES
INVENTORS
Henry M. Sutton
Walter L. Steele and
Edwin G. Steele.
BY
Attorney No. 898,020. PATENTED SEPT. 8, 1908.
H. M. SUTTON & W. L. & E. G. STEELE.
SEPARATING TABLE.
APPLICATION FILED SEPT. 22, 1906.
7 SHEETS—SHEET 6.
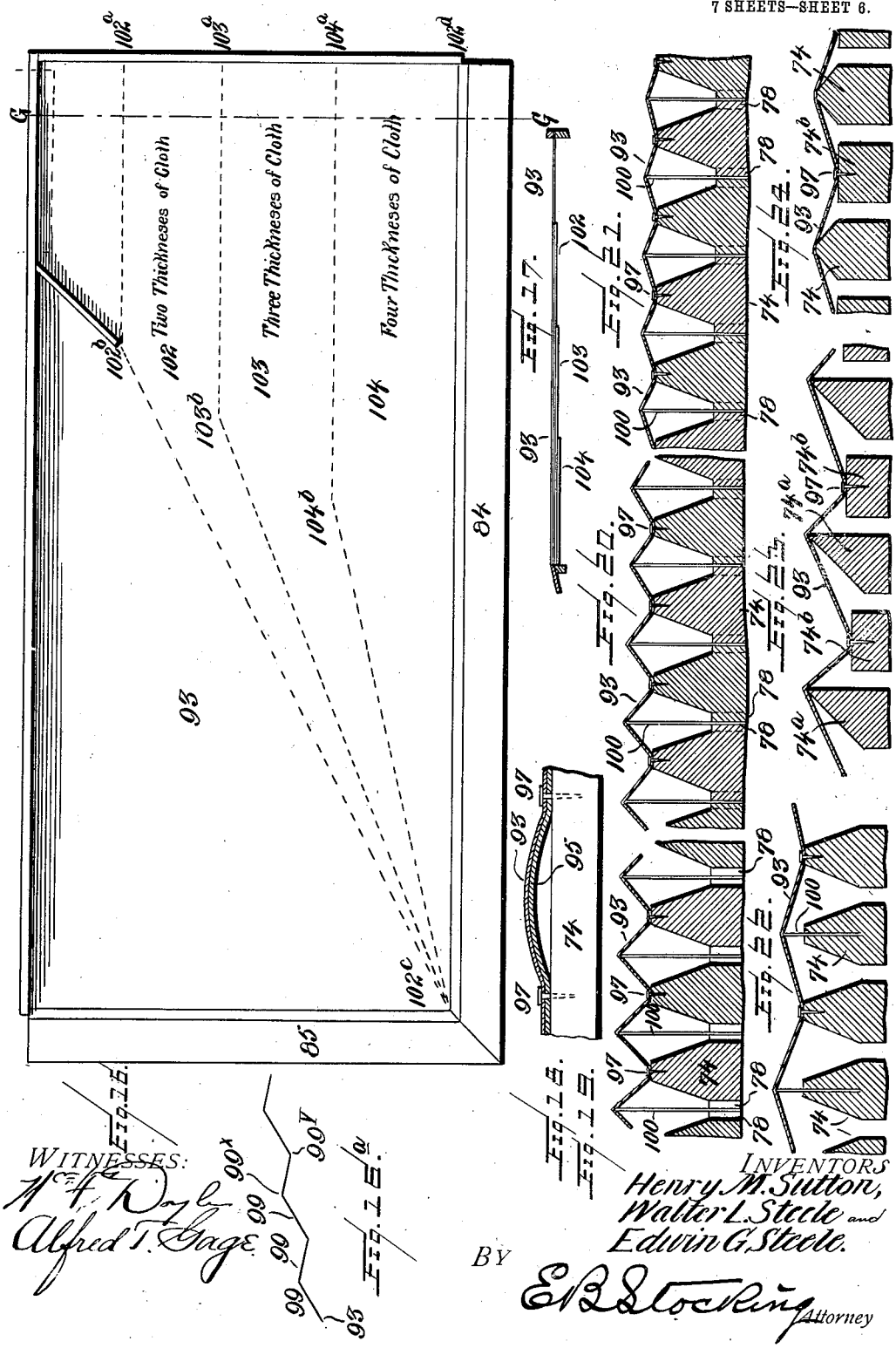
WITNESSES:
INVENTORS
Henry M. Sutton,
Walter L. Steele and
Edwin G. Steele.
BY
E. B. Stocking
Attorney No. 898,020.
PATENTED SEPT. 8, 1908.
H. M. SUTTON & W. L. & E. G. STEELE.
SEPARATING TABLE.
APPLICATION FILED SEPT. 22, 1906.
7 SHEETS—SHEET 7.
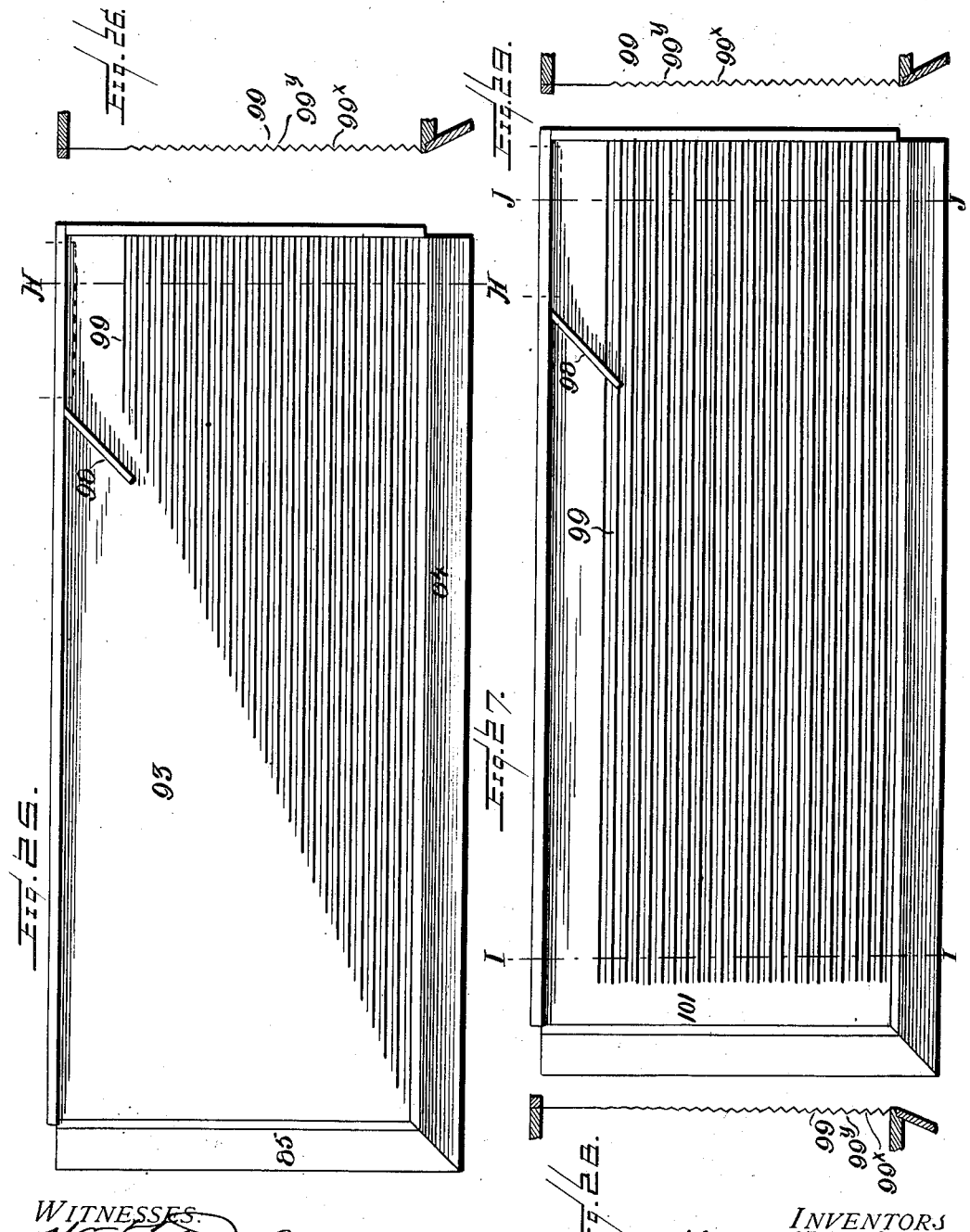
WITNESSES
INVENTORS
Henry M. Sutton,
Walter L. Steele and
Edwin G. Steele.
BY
Attorney

UNITED STATES PATENT OFFICE.

HENRY M. SUTTON, WALTER L. STEELE, AND EDWIN G. STEELE, OF DALLAS, TEXAS.

SEPARATING-TABLE.

No. 898,020.  Specification of Letters Patent.  Patented Sept. 8, 1908.

Application filed September 22, 1906. Serial No. 335,836.

*To all whom it may concern:*

Be it known that we, HENRY M. SUTTON, WALTER L. STEELE, and EDWIN G. STEELE, citizens of the United States, residing at Dallas, in the county of Dallas, State of Texas, have invented certain new and useful Improvements in Separating-Tables, of which the following is a specification, reference being had therein to the accompanying drawing.

This invention has relation to a dry concentrating table of that class which is employed for the purpose of separating pulverized ore, or other pulverulent material into its constituent elements, and the objects and advantages of the invention will be set forth in the following description and its novel features will be particularly pointed out in the claims.

Heretofore, for example, as shown in U. S. Patent 797,239 granted to us and dated August 15, 1905, a dry concentrating table having a pervious top provided with riffles and having means for maintaining an upward pressure of air through said pervious top, has been employed for the concentration of pulverized ore, and one of the objects of this invention is to avoid the use of riffles or any other obstructions upon the upper surface of a pervious table and thereby to facilitate the concentration or separation, into its constituent elements, of the material treated upon the table.

In the further description of this invention and in setting forth the fact that the upper surface of the pervious floor of the table is free from obstructions, it is deemed proper to state that the term "obstruction" is intended to include a riffle or any other device or any configuration of the floor which performs or tends to perform the well known function of, or to produce the result effected by a riffle. The function of a riffle or obstruction is to subdivide the body of ore upon the table into separate bodies in which by the action of gravity or other active force, the ore, so far as its constituent elements are concerned, assumes the form of strata, the elements having the greater specific gravity constituting the lowest strata of the formation.

We have discovered that the presence of riffles or obstructions at or upon the upper surface of the floor of a table are detrimental to a successful separation or concentration of the elements of the material being treated, and have therefore devised a pervious table having no riffles or obstructions whatever upon its upper surface whereby we not only utilize the difference in the specific gravity of the elements, but also utilize the difference in what may be termed the frictional-value of these elements whereby those having practically the same specific gravity, or being so little different in specific gravity from each other that it would be impossible to separate them by their difference in specific gravity alone, may be separated by reason of their difference in frictional-value. By "frictional-value" we mean the facility with which a particle of matter will move or slide upon a surface or upon other particles of matter.

While it is true that specific gravity and frictional-value have a certain relation to each other in that ordinarily particles of like gravity would have practically the same frictional-value, other characteristics being equal, still there are numerous exceptions to this broad statement caused principally by the formation, shape or other distinguishing characteristic between the particles in consideration. For example, garnet and zinc blende have practically the same specific gravity, but garnet is an abrasive material, that is, it is one of the hardest substances known and has sharp edges similar to emery, while zinc blende on the other hand has slightly rounded edges and is comparatively smooth and hence has a less frictional value than garnet. It therefore follows that in an application of an upward pressure of air through the pervious table and through the pulverized ore thereon that the particles are cushioned on the air and that meeting with no obstructions or riffles in their passage over the floor of said table ample opportunity is afforded for the uninterrupted action of not only the specific gravity but of the frictional value of the different particles of the material. Herein lies the essential importance of a pervious floor without obstructions thereon.

Further objects and advantages of the invention will be hereinafter set forth.

In the drawings:—Figure 1 is a perspective of a concentrating table and its operating mechanism constructed in accordance with our invention; Fig. 2 is a side elevation looking at the side opposite that shown in Fig. 1; Fig. 3 is a plan of the foundation frame work of the machine with the table removed; Fig. 4 is an elevation of the feed end of the machine; Figs. 5 and 6 are details, partly in section, of the table reciprocating mechanism; Figs. 7 and 8 (Sheet 1) are details of one of the table supports; Fig. 9 is a plan of the table with portions of its pervious floor broken away; Fig. 10 is a longitudinal section on the line A—A, Fig. 9; Fig. 11 is a transverse section on the line B—B, Fig. 9; Fig. 12 is a transverse section on the line A′—A′, Fig. 9; Fig. 13 is a transverse section of the table and the air chamber beneath the same; Fig. 14 is a longitudinal section of the table and the air chamber beneath the same; Fig. 15 is a section similar to that shown in Fig. 12 but upon a larger scale; Fig. 16 is a plan of the table showing a modified form thereof; Fig. 16$^a$ is a diagrammatic section of floor conformation; Fig. 17 is a section on the line G—G, Fig. 16; Fig. 18 is a detail showing one form of securing the pervious floor in position; Figs. 19, 20, 21, 22, 23 and 24 illustrate different methods of producing an undulating unobstructed pervious floor; Fig. 25 is a plan of one form of table with an undulating unobstructed pervious floor; Fig. 26 is a transverse section of the floor shown in Fig. 25 taken on line H—H; Fig. 27 is still another form of a table having an undulating unobstructed pervious floor; Fig. 28 is a transverse section on the line I—I of the floor shown in Fig. 27, and Fig. 29 is a transverse section of the floor shown in Fig. 27 taken on the line J—J.

1 (Figs. 1, 2 and 3) designates a suitable foundation frame work for a concentrating table constructed in accordance with our invention, and provided with a suitable number of cross timbers 2, two of which are extended at one side to form the foundation of uprights 3, 3 for the support of the hopper and its driving mechanism.

4, 4 are braces for giving rigidity to the uprights 3.

5, 5 are the supports employed upon the lower side of the table. Each of these supports is widened at its top and provided with a bearing rod 6 which fits the bearing block 7 that is secured in any suitable manner to the under surface of the table. At its lower end the support 5 has a semicylindrical recess 8 adapted to fit the cylindrical head 9 of a threaded bolt 10 mounted in a bracket 11 which is secured to the upper edge and side of the longitudinal beams of the foundation, as clearly shown in Fig. 1. The support at the feed end of the table is constructed similarly to that just described except that its lower end 12 is cylindrical and fits a similarly formed recess in the bearing block 13 mounted upon the foundation 1.

The table at the upper or feed side thereof is supported by the device illustrated in Figs. 2 and 4. A casting 14 is secured to the under surface of the table and is provided with a cylindrical head 15 which, with the socket 16 at the upper end of the connecting link 17 constitute a ball and socket joint. A similar socket 18 and cylindrical head 19 of the bolt 20 constitutes another ball and socket joint. The bolt 20 is mounted in a suitably threaded bracket 21 and has a worm gear 22, Fig. 4, rigidly secured thereto which is adapted to be rotated by the worm 23 upon the shaft 24, on the end of which is a hand wheel 25 for rotating said shaft, whereby the feed side of the table may be elevated or depressed as desired. A duplicate bolt 20, worm-gear and worm is provided near the feed end of the table, as shown. An intermediate bearing 26 serves to maintain the shaft in a right line.

It will be seen from the description already given that the table is adapted for longitudinal reciprocation without any lateral reciprocation whatever. This latter feature is insured by the triangular form of supports 5 at the lower side of the table.

The means herein shown for giving the longitudinal reciprocation to the table is but one of many forms which may be adopted.

27, Figs. 1, 2, 3, 4 and 5, represents a casting mounted upon the foundation and secured thereto in any suitable manner, and comprising the bearings 28 of the main shaft 29 carrying the fast and loose pulleys 30 and 31 respectively. It also carries the fast pulley 32 for driving the feed mechanism in the manner hereinafter described. By reference to Figs. 5 and 6 it will be noted that the main shaft 29 carries an eccentric 33 which is embraced by boxes 34 slidingly mounted in a bell crank lever 35, said lever being mounted upon a fixed pivot 36.

37 is a removable cover adapted to fit the casting 27 and to inclose the bell crank and its operating mechanism. The shorter arm of the bell crank 35 is slotted for the reception of the block 38 and rendered adjustable in the slot by the bolt 39 passing therethrough, the block having trunnions 40 for the connection therewith of the yoke 41 (see Fig. 2) with which the table is connected by means of the rod 42 and the bracket 43 projecting from beneath the table. The rod 42 is passed through the bracket and is provided with convex washers 44 and lock nuts 45, to adjust the inclination of the links 17.

The lower central portion of the casting 27 constitutes a hollow chamber, and the bearings 28 are grooved as at 28$^a$ to permit the passage of oiling chains 46 over the journals of the main shaft 29 whereby oil is carried up to said journals for lubricating the same. A slot 47 is formed in the cover 37 for the passage therethrough of the yoke 41. 48 and 48$^a$ are springs, 48$^a$ for steadying the motion, and 48 for counterbalancing the weight of the table as it is supported upon the inclined links 5 and 17, their inclination being toward the feed end of the table, and each of said springs 48 provided at its upper end with an antifriction roller 49 contacting with a bracket 50 depending from the table.

51 is a bracket secured to the base and carrying a clamp 52 in which the spring is firmly secured, while the extension 53 of the spring bears against the adjusting bolt 54 passing through the bracket 55 secured to the base. This provides means for regulating the tension of the springs 48 against the brackets 50.

The bracket 56, best shown in Figs. 1 and 4, of proper conformation is secured to one of the supports 3 and serves the purpose of bearings for the shaft 57 carrying the pulley 58 and provided with any well known crank construction 59 which through the medium of connecting rod 60, Fig. 1, serves the purpose of reciprocating the feed trough 62 of the hopper 63, said trough being supported pendulously by rods 64 passing through brackets 65 secured to the hopper and having adjusting nuts 66 for regulating the trough 62 vertically. The hopper 63 is connected with the uprights 3 in any suitable manner. A belt or band passing over the plulley 58 to the pulley 32 on the main shaft gives the necessary rotation to the crank shaft 57.

As thus far described we have a suitable foundation, a table mounted thereon for longitudinal reciprocation, a hopper above the table with a reciprocable trough for delivering material from the hopper onto the table and suitable devices for adjusting the inclination of the table transversely, the position of the table lengthwise being horizontal so far as any device thus far described is concerned. It is apparent that upon the rotation of the main shaft 29 a horizontal reciprocation of the table will take place, and that by means of the adjustment of the block 38 in the short arm of the bell crank 35 the length of the horizontal reciprocation may be adjusted.

It is in the connection of the shaft 29 with the longer arm of the bell crank 35 that the novel feature of this mechanism rests. It will be observed that taking the rotation of the shaft 29 to be in the direction of the arrow, Fig. 6, that as the longer radius of the eccentric moves from directly over the center of the shaft 29 to the right for a distance of 90° that the first effect is to slide the box 34 toward the pivot of the bell crank thus producing a shorter arm which acts from that point until it reaches a point directly beneath the center of the shaft, 29, to quickly depress the long arm of the bell crank and thus through the connecting rod 42 to quickly return the table toward the hopper. The next quarter circle of movement of the long arm of the eccentric first effects a sliding movement of the boxes 34 away from the pivot 36 of the bell crank and to act from a point horizontally opposite the center of the shaft 29 to a point vertically over said center, as the long arm of the eccentric which acts to slowly lift the long arm of the bell crank and through the connection of the rod 42 to slowly reciprocate the table in a direction from the hopper. We therefore have a slow advance and a quick return of the table and in view of the inclination of the supports 5 and 17 we have a slow forward and upward movement and a quick backward and downward return caused by the eccentric on the main shaft and the slidable bearings connecting the same with the bell crank. The advantage secured by this peculiar movement will be hereinafter described.

The construction of the body and its top will now be described, it being understood that any suitable frame work, air chamber and means for supporting the pervious floor may be employed in lieu of the construction herein disclosed.

By referring to Figs. 2 and 13 it will be noticed that there are a series of cross bars 67 connecting two side bars 68 which collectively comprise the fundamental frame work of the table. Upon the side bars are mounted side pieces 69 and these with the bottom plate 70 constitute the air chamber 71 of the table.

71$^a$ are flexible air inlet pipes communicating with any suitable source of supply to maintain a uniform pressure within the chamber 71. Within and across the air chamber there are arranged several ribs 72 having openings 73 therein to permit access of air under pressure into all parts of the chamber, the purpose of said ribs being to form a support for a series of floor supporting ribs 74 which are suitably connected with the top frame 75, and the floor supports are bound together by bolts 76, those upon the upper or feed side of the table passing through and securing in position a retaining or marginal strip 77. The ribs 74 extend longitudinally of the table, as shown in Fig. 14, and while they may be made of separate strips of material assembled edgewise and spaced by blocks 78, as shown in Figs. 19 to 21, inclusive, a preferable form of construction is to form by a saw or other suitable implement parallel slits in a plank of suitable width leaving portions 79, Fig. 14, grooved but unslitted for the purpose of the passage therethrough of transverse rods 80 provided with a thread and nut 81 for the purpose of binding a number of these slitted sections together to form a support for the pervious floor of the table which support is adapted for the passage of air under pressure through the slits and grooves or extensions 82 of the slits through the solid portion of the plank from which the sections are made. These grooves or extensions provide means for preventing any dead spaces which prevent the passage of air through the pervious floor. After forming the slits in the manner just described, the intermediate ribs are tapered, as clearly shown at 83, said taper being modified in the manner hereinafter described for special purposes.

A clear understanding of the section shown in Fig. 13 will be had by stating that the right hand portion of said figure represents a section near the end of the body where the transverse binding bolt or rod passes through the solid wood, while the portion at the left is a vertical transverse section of the ribs at the portions where there is no transverse binding rod. The table is provided with the usual inclined delivery shelves 84 and 85 at the lower side and delivery end, respectively, the former being provided with a rail 86 supported by spacing tubes 87 through which bolts 88 pass and by means of nuts 89 passing through brackets 90 secured in any suitable manner to the side and end respectively of the body, serve to secure the parts in operative position.

A channel bar 76ª may be attached to stiffen the table if desired. The rail 86 is provided for the purpose of maintaining, removably, in position certain fingers 91 maintained in position by a wedge 92 driven between the under surface of the rail and the upper edge of the finger whereby the shelf may be divided into sections constituting chutes or spouts for directing the product of the table in its passage over the shelf or shelves.

93 represents what is herein denominated as a pervious floor of the table, and it consists of any textile material of the desired weave and fineness of mesh which will permit the passage of air under pressure upward therethrough so as to act upon the body of ore in pulverized condition upon the floor. This floor 93 may be supported upon the upper edges of the ribs 74 in any desired manner, and its outer margins may be secured by means of the marginal strip 77 and of the plate 94 along the lower edge of the table, said strip and plate acting as a clamp in a well known manner.

Referring to Fig. 9 the pervious floor is shown broken away at the feed and delivery ends of the table. At the feed end there is shown a series of air retarding strips 95 which decrease in width from the delivery side of the table towards the feed side. These strips are arranged each upon one of the floor supporting ribs 74, as clearly shown in Fig. 12, and extend longitudinally upon its rib and terminates in a point, each strip being tapered throughout its length, and the series of strips terminate on a diagonal line extending from one corner to the diagonally opposite corner of the table. In other words, the air retarding strips 95 are gradually narrower in width from the corner E to the corner F at the feed end of the table and terminate on a diagonal extending from the corner C to the corner F of the table. The purpose of these air retarding strips is to modify the action of the upward pressure of air through the floor throughout that portion thereof at which the strips are arranged in such a manner that the action of the air increases at increasing distances from the feed end of the table along a line extending longitudinally of the table and decreases on transverse lines. The strips occupy the triangular lower and rear portion of the table. The triangular upward and forward portion of the table is also given a novel construction by means of a series of strips 96 (see Figs. 9 and 11) each mounted upon the rib 74 of the same width as the upper surface of the rib, but diminishing in height from the corner D to the corner C of the table gradually and terminating in the plane of the upper surface of the strips 74 successively and collectively along the line extending from the corner C to the corner F whereby the upper and forward triangular portion of the table gradually ascends above the plane of the lower and rear triangular portion thereof for the purpose hereinafter to be described.

Fig. 15 illustrates one method of securing the floor and the air retarding strips to the supporting ribs 74, although any other suitable means may be employed. In this instance tacks 97 are driven through the floor and retarding strips into the upper edge of the supporting ribs. These tacks are passed through both the floor and the strips for the purpose of maintaining contact between the air retarding strips and the pervious floor when the air pressure is applied, the tendency being to raise the floor and strip together, as illustrated in exaggerated proportion in Fig. 18. It is apparent that if the retarding strips were tacked to the ribs independently of the pervious floor the latter might be raised separately from the strip and therefore produce a failure of the function of the strip which is to in part restrict the passage of air through the floor.

As thus far described the floor of the table is absolutely free from obstructions such as riffles or any device performing the function of a riffle. There is, however, as clearly shown in Figs. 1 and 9, a short bar 98 the purpose of which is to prevent the immediate movement of material longitudinally along the table as it emerges from the delivery chute of the hopper, and it will be noted also by reference to Fig. 9 that there are no air retarding strips at that portion of the table so that it is an absolutely accurate statement that the floor of the table is without obstructions because the function of the strip 98 has but little to do with the process of concentrating or separating the elements of the material being treated into separated zones, as hereinafter described.

The floor of the table thus far described is practically flat, but this is not an essential characteristic of the invention. Referring to Fig. 16ª it will be seen that if the floor were formed with a series of longitudinal grooves or valleys or inclined surfaces 99, said surfaces would be when the table is, as a whole, inclined, as it is in use, practically flat in that the point 99ˣ would be practically on a level with the point 99ʸ so that no obstruction to the longitudinal nor to the transverse flow of material over the table is presented in this modified form of pervious floor. This form of floor may be produced by securing the floor to the top of the ribs 74 by the tacks 97 as before described, and by the interposition between the ribs or into or upon alternate ribs, of the plates or bars 100 extending above the upper surface of the ribs so as to give the grooved or channeled form of floor illustrated in Fig. 16ª. The distance above the ribs to which said plates or bars project will determine the depth of the grooves of channels, as illustrated in Figs. 19 to 22, inclusive.

Figs. 23 and 24 illustrate different forms of ribs, in which the rib 74ª is tapered from one side only and, used in connection with the untapered rib 74ᵇ, produces channels one side of which is wider and flatter than the adjacent side, while by the interposition of the flat topped ribs 74ᵇ between the ribs 74 channels having sides of equal inclination and area are produced.

When the pervious floor is channeled as just described, or in any equivalent manner, the channels may terminate on the diagonal line C F (see Fig. 25) as do the air retarding strips, or they may merge into an unchanneled transverse portion 101, as shown in Fig. 27, at the delivery end of the table, and these channels may vary in depth and inclination as indicated in the cross sections shown in Figs. 26, 28 and 29, or they may extend the length of the table.

There remains still another modification of the means for varying the action of the air under pressure passing upward through the floor of the table, and it consists in constructing the floor of a multiplicity of thicknesses of cloth, as clearly illustrated in Fig. 16. In this instance there is the upper pervious floor 93 extending wholly over the air chamber of the table. To the under surface of said floor 93 is secured one thickness of textile material 102 extending, along the line 102ª—102ᵇ, then on the diagonal line extending from the corner C to near the corner F, to the point 102ᶜ, then along the lower edge of the table to the point 102ᵈ, this constituting a double-thick pervious floor within the area of said lines. There is next applied to the under surface of the piece 102 a piece of textile material 103 covering the area of the table bounded by the lines 103ª 103ᵇ 102ᶜ and 102ᵈ making thus far a pervious floor of three thicknesses over said area. Then there is applied another piece 104 on the under surface of the piece 103 covering the area included in the lines 104ª 104ᵇ 102ª and 102ᵈ constituting an area of four thicknesses bounded by said lines. The function of these additional thicknesses of pervious flooring is to vary the action of the air upon the material passing over the floor and in a manner somewhat different from that performed by the strips 95, but still varying at different points of the floor as a whole.

The air retarding strips could be of such a density as to totally obstruct the passage of the air through them, but in such case they are preferably made narrower than herein shown. This does not produce a different effect from that herein described for the following reasons:—When in operation the impervious strips act to check the body of ore from moving across the table transversely which it would do otherwise under action of the air if the table was all pervious. When the table is in operation the first part of the ore which would be composed of the lighter minerals (as these travel transversely faster than the heavier ores) come in contact with the impervious strips they are immediately checked in their transverse course and temporarily detained on the table immediately over one of these air retarding strips, owing to the fact that there is no air to move them, but the heavier minerals, which are also traveling in part transversely crowd these lighter minerals from off of these strips as well as from those portions where the passage of the air through the floor of the table is restricted, therefore, it is not departing in the least from the essence of this invention to use impervious strips in the composition of the floor of this table. We have found that these strips, if to be used as impervious ones, should be applied in the shape of paint or varnish on the under side of the textile material forming the floor of the table, as applying it to the top side thereof defeats the object of the invention because it alters the cloth surface of the floor when so applied as the frictional value of the textile material is thus altered or destroyed, unless the character of material used to render impervious the air retarding strips be of such a nature as not to change the textile surface of the cloth.

By the terms air controlling, retarding or obstructing strips herein used we wish to be understood as including strips located at the under surface of the floor and operating to limit, retard or wholly obstruct the passage of air through the floor at such portions thereof as are provided with said strips.

The banking strip or bar 98 is intended to initially detain the material at or near the feed point of the table. This enables the minerals to stratify and emerge at the lower end of the banking strip into separate zones. The material is not positively obstructed by the banking strip as it is placed approximately on the transverse inclination of the table and does not obstruct the ore in the sense of riffles on this class of tables and does not subdivide the body of ore into separate bodies.

The table is perfectly operative without the banking strip, but in the event of its being omitted the zones of the different minerals do not become sharply defined until the body of ore has reached the middle of the table. The greater distance the minerals can travel, the sharper will be the definition between them as the banking strip produces this effect at or near the feed, the zones of separated material become more sharply defined from each other by the time they have reached the delivery side of the table, thereby producing cleaner products of each mineral.

Having described the mechanical construction of a concentrating or separating table provided with a pervious floor having no obstructions upon its upper surface and some modifications in specific forms of said floor it is deemed proper to state with further definiteness the operation of such floor upon the material passing thereover. It is understood that by means of the mechanical adjusting devices hereinbefore described the table is arranged with the lower side thereon in nearly a horizontal line, the feed end being slightly lower, and with the feed side in a higher plane so that the whole surface of the table is transversely inclined. In this position the natural course of the material fed upon the floor from the hopper would be upon transverse lines towards the lower edge of the floor, and this natural tendency is, by the longitudinal reciprocation of the table overcome to such an extent that the path taken by the ore is practically intermediate in direction which is substantially on, or practically parallel with, the diagonal line extending from the upper corner at the feed end to the diagonally opposite corner of the table. Different materials require different adjustment. Now, when the upward pressure of air is provided through the floor the separation of the various minerals into separate bodies or zones is greatly facilitated by the fact that the particles are cushioned in the air upon and immediately above the upper surface of the floor, and by the fact that there are no riffles or conformations of the floor which are equivalent to riffles, and which would act to destroy or prevent the stratification or the arrangement of the minerals into distinct zones and to, in a measure, render nugatory the cushioning action of the air. Without such obstructions, however, and by reason of the relative difference in the weight of the particles and in the difference in their frictional value on the surface of the floor of the table and upon each other while cushioned or under the influence of the air cushion, and as the heavier particles of the minerals will always crowd aside or replace a lighter one from the upper portion of the floor and where the volume of air is reduced in amount in passing through the pervious floor, caused by the air retarding strips an unobstructed air-cushioning and zone-forming process, or operation, takes place during the operation and upon the floor of the table as a whole and each constituent element of the ore is finally delivered at a different point from that at which the others are delivered.

Taking Fig. 1 into view the operation of the invention may be stated to be as follows:—When the ore is fed from the hopper chute 62 it falls upon that portion of the floor where there are no air retarding strips, and under the cushioning action of the air the minerals stratify themselves according to weight by reason of their temporary detention at that point by the short banking strip or bar 98. The heaviest mineral remains next to or upon the cloth floor, the next heaviest above that and the lightest upon the top, the stratification assumes an angle to the surface of the floor, and as the particles of ore are cushioned from each other, and the strata likewise, the inclination which the strata have assumed causes them to slide each from off the other so that at the lower corner of the banking strip 98 the different minerals begin to form into zones and each takes a well defined path more or less diagonal along the floor. In separating zinc ore which contains lead and iron pyrites the lead being the heaviest and existing in the form of square cubes having sharp corners and therefore the greatest frictional value, causes it to be more sluggish in its movement than the other minerals and not so much cushioned by the air as the others, consequently it is the last to make its appearance at the lower corner of the banking strip. During the first few moments of the operation of the table the gangue or lighter minerals spread over the entire surface of the floor. The first of the heavy minerals to make its appearance at the lower corner of the banking strip 98 is the zinc which begins to crowd the gangue to the rear. Next the iron makes its appearance and begins to crowd the zinc, and last, the lead which crowds the iron so that after the table has been run for a short time it presents the appearance shown in Fig. 1. This whole action is due to the difference in frictional value or mobility of the particles which is utilized by cushioning the particles in the air. As stated the lead is more sluggish and less mobile than the other particles and travels across the floor more longitudinally, and in one form illustrated in Fig. 9 the upper diagonal half of the table is raised by means of the strips 96 in order to make the minerals take a more diagonal course.

This modification in the plan of the upper surface of the floor of the table seems to be advantageous for treating some combinations of minerals while in others said modification is not essential.

In treating the lead ore the lead crowds against the mineral next to it and the latter being mobile and freer to move than the lead takes a path across the floor in a line affording the least resistance which is naturally a zone approximately parallel to the lead ore, and on account of the freer mobility of its particles they are unable to climb up on the steeper portion of the floor occupied by the lead. The fact that they travel at a different rate of speed will prevent them intermingling with other minerals. The same is true with the iron in its effect upon the zinc and the zinc upon the gangue.

The air retarding strips being preferably of a textile material of less porosity than the material constituting the floor of the table act to perform the function indicated by the name given them, but they also by reason of their tapered form provide unobstructed passages extending longitudinally of the table and increasing in area from the feed end toward the delivery end. The action of these air retarding strips upon all minerals or particles is in proportion to their weight. The air passing through these air retarding strips is reduced in pressure and insufficient to cushion the heavier minerals. The result is to check their transverse movement and therefore they become more affected by the longitudinal movement of the table. The light minerals on the other hand are sufficiently cushioned by the air so that they meet with comparatively little resistance. As these are removed the strips increase in width and as the pulp travels transversely the next heavier minerals begin to be affected, and just in proportion as these minerals are checked during the transverse movement so do they take up a longitudinal movement imparted to them by the reciprocation of the table.

Another important feature of the operation is that while the table is in operation the pulp is resting upon an elastic cushion of air. When the table is raised in its forward movement the air cushion suffers more or less compression and thus causes the heavier particles to come into contact with the surface of the floor of the table sooner and remain in contact with it longer on the return movement of the table than the lighter ones and to this fact is due also the difference in the rate of speed at which the particles travel.

It remains to show the action of the modifications in the superficial outline of the floor of the table. It is apparent that when said floor is formed into longitudinal channels 99 that the practical effect is to give a greater superficial area to the floor of the table of given dimensions as compared with a practically flat floor of the same table. The transverse inclination of the table does not render the channeled surface the equivalent of a riffle or other obstruction because of the fact that the longitudinal movement is unobstructed, and there is also a somewhat different application of the air pressure to the material upon the inclined sides of the channel. These channels may, of course, be either continuous and of uniform or varying area in cross section or it is clear that they may be of varied area in cross section and terminate either upon a diagonal or a straight transverse line within the area of the floor, as illustrated in Figs. 25 to 29, inclusive.

The modification shown in Fig. 16 clearly provides means for varying the effective force of the air in its passage through the floor of the table, a function which is performed by the strips 95 in Fig. 1 as well as by the channel forms of floor hereinbefore described.

In all of these various forms of the floor of the table there is provided means for utilizing not only the difference in specific gravity existing in the particles, but also for utilizing the differences in frictional value existing in these particles, and the utilization of these characteristics inherent in the particles demands the absence of any obstructions which interfere with the proper stratification and the proper cushioning action by the air whereby regulated transverse movements of the particles upon the transversely inclined table is secured in proportion to the weight of the particles, and in proportion to their frictional value. It is essential to the utilization of the frictional value of the particles that a cushioning action of the air must be present in order to permit the frictional value to operate upon the floor or other particles.

Another feature of the operation of an unobstructed pervious floor having air retarding means arranged beneath said floor, or having a channeled conformation to modify the cushioning function of the air, is that when the table is raised and forwarded in its forward reciprocation, the air cushion suffers more or less compression which causes the heavier particles to contact with the floor sooner and remain in contact therewith longer, on the return movement of the table, than the lighter particles and to this fact is due the difference in rate of speed at which different particles travel. The variable widths, lengths, thicknesses, and areas of the various air retarding means shown, and the varied conformation of the pervious floor varies the cushioning function of the air in that it diminishes transversely and increases longitudinally at all points of the floor included by or immediately adjacent thereto. Thus the cushioning function is more closely adapted to the partially separated condition of the ore as it exists at all points during its movement over the table. In other words, no obstructions are present to prevent stratification or to break up stratification which has once formed, and the air cushion is adapted in force or effectiveness, exactly to the existing condition of the material at all points on and over the surface of the floor, and to the inherent specific gravity and frictional value of the particles so that a finer, more exact and more complete separation is insured.

It is apparent that the effectiveness of the upward pressure of air through our pervious floor is varied by the retarding strips, Fig. 9, the multiple thicknesses of textile material shown in Fig. 6, and by the channel construction, Figs. 26 and 27, especially in the latter, in that the meshes of the fabric are at an angle to the current of air, which is preferably continuous, and hence it is retarded and does not so strongly and directly act upon the material upon the upper surface of the floor as when the meshes are in line with the movement of the air. In fact, each side of a channel may be considered an unobstructed floor of limited area on which the process of separation according to frictional value is taking place.

It is apparent that many changes, additions and omissions of minor details herein shown may be made within the range of mechanical skill without a departure from the fundamental principles of our invention, and therefore we do not limit our invention in these particulars, but What we do claim is:—

1. A concentrating table having a floor free from obstructions and impervious to the passage of material therethrough while pervious to air under pressure, in combination with means for passing air through said floor, means for causing the heavier and lighter materials to travel in divergent paths, and separated air controlling strips secured in contact with the under surface of said floor and disposed to form intermediate continuous air passages extending substantially transversely to the path of travel of the relatively lighter components of the material thereon.

2. A concentrating table having a floor free from obstructions and impervious to the passage of material therethrough while pervious to air under pressure, in combination with means for passing air through said floor, and separated air controlling strips each having a tapered outline secured in contact with the under surface of said floor and disposed transversely to the path of travel of a relatively lighter component of the material thereon.

3. A concentrating table having a floor free from obstructions and impervious to the passage of material therethrough while pervious to air under pressure, in combination with means for passing air through said floor, and controlling means extending transversely to the path of travel of a relatively lighter component of the material thereon and gradually varying the width throughout the length thereof.

4. A concentrating table having a floor free from obstructions and impervious to the passage of material therethrough while pervious to air under pressure, in combination with means for passing air through said floor, and separated air controlling strips secured in contact with the under surface of said floor and disposed transversely to the path of travel of a relatively lighter component of the material thereon, said table being provided with an uncontrolled area beyond the longitudinal termini of the strips.

5. A concentrating table having a floor free from obstructions and impervious to the passage of material therethrough while pervious to air under pressure, means for causing the heavier and the lighter materials to travel in divergent paths thereon, in combination with means for passing air through said floor, and means disposed transversely to the path of travel of the relatively lighter component of the material thereon for controlling the effectiveness of said air pressure through said floor in different lines longitudinally of the travel of the heavier components.

6. A concentrating table having a floor free from obstructions and impervious to the passage of material therethrough while pervious to air under pressure, means for causing the heavier and the lighter materials to travel in divergent paths thereon, in combination with means for passing air through said floor, and means for rendering said air pressure decreasingly effective transversely of the path of travel of a relatively lighter component of the material upon the floor.

7. A concentrating table having a floor free from obstructions and impervious to the passage of material therethrough while pervious to air under pressure, means for causing the heavier and the lighter materials to travel in divergent paths thereon, in combination with means for passing air through said floor, means for rendering the air pressure through said floor increasingly effective transversely of the path of travel of a relatively lighter component of the material thereon and in parallel separated spaces.

8. A concentrating table having a floor free from obstructions and impervious to the passage of material therethrough while pervious to air under pressure, in combination with means for passing air through said floor, and means for rendering said air pressure through said floor decreasingly effective transversely of the path of travel of a lighter component of the material thereon and increasingly effective longitudinally of said path and in parallel separated spaces.

9. A floor for a concentrating table impervious to the passage of material therethrough and pervious to air under pressure and having tapered air controlling strips differing in width at the feed end of the floor and disposed transversely of the path of travel of a relatively lighter component of the material thereon.

10. A floor for a concentrating table impervious to the passage of material therethrough and pervious to air under pressure and having tapered air controlling strips differing in width at the feed end of the floor and disposed transversely of the path of travel of a relatively lighter component of the material thereon and merging into an area free from air controlling means.

11. A floor for a concentrating table impervious to the passage of material therethrough and pervious to air under pressure and having tapered air controlling strips differing in width at the feed end of the floor and disposed transversely of the path of travel of a relatively lighter component of the material thereon and terminating on a diagonal line within the area of the floor and merging into an area free from air controlling means.

12. A floor for a concentrating table impervious to the passage of material therethrough and pervious to air under pressure, said floor having air controlling strips upon its lower surface terminating in a diagonal line and having a triangular portion at the delivery end of the floor upwardly inclined from the remaining portion thereof and free from air controlling strips.

13. In a concentrating table, a floor inclined transversely to the path of travel of one of the components of the material thereon and free from obstructions and impervious to the passage of material therethrough while pervious to air under pressure, in combination with an air chamber beneath said floor and means for supplying air thereto, means for reciprocating said table, and separated air controlling means secured in contact with the under surface of said floor and disposed transversely of the path of travel of a relatively lighter component of the material thereon.

14. In a concentrating table, an unobstructed floor impervious to the passage of material therethrough and pervious to air under pressure, said floor being inclined laterally and longitudinally relatively to the path of travel of one component of the material thereon, separated air obstructing means secured upon the under face of said floor and disposed transversely of the path of travel of a relatively lighter component of the material thereon, and means for passing air through said floor.

15. In a concentrating table, an unobstructed floor impervious to the passage of material therethrough and pervious to air under pressure, said floor being inclined laterally relatively to the path of travel of one component of the material thereon, separated air obstructing means secured upon the under face of said floor and disposed transversely of the path of travel of a relatively lighter component of the material thereon, an air chamber beneath said floor, and means for oscillating said floor upwardly in a vertical plane at a less speed than in its return movement.

16. A concentrating table having a floor free from obstructions and impervious to the passage of material therethrough while pervious to air under pressure, means for passing air through said floor, separated air retarding strips secured upon the under surface of said floor and disposed to form intermediate continuous air passages extending substantially transversely to the path of travel of a relatively lighter component of the material thereon, a hopper to deliver material at one end of said floor, and a bar arranged transversely of the floor in proximity to said hopper to prevent immediate longitudinal movement of the material over said floor.

17. A concentrating table having a floor free from obstructions and impervious to the passage of material therethrough while pervious to air under pressure, in combination with means for passing air through said floor, separated air controlling strips secured in contact with the under surface of said floor and disposed to form intermediate continuous air passages extending substantially transversely to the path of travel of the relatively lighter components of the material thereon, and means for reciprocating said table longitudinally of the air controlling strips thereon.

In testimony whereof, we affix our signatures in presence of two witnesses.

HENRY M. SUTTON.
WALTER L. STEELE.
EDWIN G. STEELE.

Witnesses:
O. H. BEHRENS,
DORA McMAHAN.